(12) United States Patent
Akazawa et al.

(10) Patent No.: US 7,519,716 B2
(45) Date of Patent: Apr. 14, 2009

(54) INFORMATION PROVIDING METHOD, INFORMATION PROVIDING SYSTEM, TERMINAL DEVICE, CENTRAL APPARATUS AND COMPUTER MEMORY PRODUCT

(75) Inventors: Yoshiko Akazawa, Kawasaki (JP); Masanao Fukuichi, Tokushima (JP); Masafumi Otsuka, Tokushima (JP)

(73) Assignee: FUJITSU LIMITED, Kawasaki (JP)

( * ) Notice: Subject to any disclaimer, the term of this patent is extended or adjusted under 35 U.S.C. 154(b) by 675 days.

(21) Appl. No.: 10/026,557

(22) Filed: Dec. 27, 2001

(65) Prior Publication Data
US 2003/0065794 A1 Apr. 3, 2003

(30) Foreign Application Priority Data
Sep. 28, 2001 (JP) ............................. 2001-304675

(51) Int. Cl.
*G06F 15/16* (2006.01)
(52) U.S. Cl. ....................... 709/229; 709/217; 709/225; 709/226; 705/51; 715/200; 715/229; 715/249; 707/9
(58) Field of Classification Search ......... 709/223–225, 709/217–219, 229; 707/10; 713/200, 201; 705/51; 715/511
See application file for complete search history.

(56) References Cited

U.S. PATENT DOCUMENTS

| | | | | |
|---|---|---|---|---|
| 5,502,637 A * | 3/1996 | Beaulieu et al. | ........... | 705/36 R |
| 5,778,368 A * | 7/1998 | Hogan et al. | ................ | 709/225 |
| 5,802,518 A * | 9/1998 | Karaev et al. | ................ | 709/229 |
| 6,161,107 A * | 12/2000 | Stern | ........................ | 707/104.1 |
| 6,189,032 B1 * | 2/2001 | Susaki et al. | ................ | 709/225 |
| 6,393,442 B1 * | 5/2002 | Cromarty et al. | ............ | 715/523 |
| 6,557,039 B1 * | 4/2003 | Leong et al. | ................ | 709/229 |
| 6,563,517 B1 * | 5/2003 | Bhagwat et al. | ............. | 715/735 |
| 6,711,575 B1 * | 3/2004 | Applewhite et al. | ......... | 707/100 |
| 6,717,938 B1 * | 4/2004 | D'Angelo | .................... | 370/352 |
| 6,804,705 B2 * | 10/2004 | Greco et al. | ................ | 709/219 |
| 6,807,534 B1 * | 10/2004 | Erickson | ...................... | 705/51 |
| 6,832,349 B1 * | 12/2004 | Seamans | ...................... | 715/500 |
| 6,834,312 B2 * | 12/2004 | Edwards et al. | ............. | 709/246 |
| 6,839,878 B1 * | 1/2005 | Icken et al. | .............. | 715/501.1 |
| 6,898,636 B1 * | 5/2005 | Adams et al. | ................ | 709/229 |
| 6,912,529 B1 * | 6/2005 | Kolfman | ...................... | 707/10 |
| 7,159,040 B2 * | 1/2007 | Stehle et al. | ................ | 709/246 |
| 7,191,392 B1 * | 3/2007 | Coar | .......................... | 715/512 |
| 2002/0042876 A1 * | 4/2002 | Smith | ......................... | 713/153 |
| 2002/0069247 A1 * | 6/2002 | Paknad et al. | ............... | 709/204 |

FOREIGN PATENT DOCUMENTS

| | | |
|---|---|---|
| JP | 2001-195295 | 7/2001 |
| JP | 2001-236328 | 8/2001 |

* cited by examiner

*Primary Examiner*—Dohm Chankong
(74) *Attorney, Agent, or Firm*—Staas & Halsey LLP

(57) ABSTRACT

One terminal device accepts provision information to be provided, and furthermore, recipient information relating to a recipient capable of receiving the provision information, and accepts a provision format of the provision information for each recipient. The accepted provision information, recipient information and provision format are transmitted to a central apparatus. In the case where a request of the provision information and the recipient information is transmitted from one of terminal devices, provision information corresponding to the registered provision format is provided to the one of terminal devices based on the received recipient information.

8 Claims, 11 Drawing Sheets

FIG. 3

| RECIPIENT DB ~151 | | | GROUP INFORMATION | | |
|---|---|---|---|---|---|
| ID | PASS-WORD | NAME | DEPT. | SUB. | |
| 1001 | **** | XXXX | TECH. | ELEC. | XY STUDY ROOM, SEMINAR |
| 1002 | **** | YYYY | SCI. | PHYS. | ZZ SEMINAR |
| 1003 | **** | XZXZ | TECH. | INFO. | XX STUDY ROOM |
| ... | ... | ... | ... | ... | ... |

FIG. 4

GROUP DB — 153

DEPARTMENT DB — 1531

| DEPT. | ID |
|---|---|
| TECH. | 1001 ~ 1815 |
| SCI. | 2001 ~ 2225 |
| LAW | 3001 ~ 3520 |
| ⋮ | ⋮ |

SUBJECT DB — 1532

| SUB. | ID |
|---|---|
| ELEC. | 1001 ~ 1053 |
| INFO. | 1101 ~ 1192 |
| APPLIED CHEM. | 1201 ~ 1255 |
| MECH. ENG. | 1301 ~ 1395 |
| ⋮ | ⋮ |

STUDY ROOM DB — 1533

| STUDY ROOM, SEMINAR | ID |
|---|---|
| XZ STUDY ROOM | 1005, 1008, 1009, 1025, ⋮ |
| XY SEMINAR | 1007, 1075, 1082, ⋮ |
| XY STUDY ROOM | 1015, 1020, 1028, 1032, 1045, 1085, ⋮ |
| ⋮ | ⋮ |

FIG. 5

| | | | | | | | |
|---|---|---|---|---|---|---|---|
| FILE(F) EDIT(E) DISPLAY(V) JUMP(G) HELP(H) | | | | | | | |

RETURN NEXT REREAD HOME RETRIEVE GUIDE PRINT STOP ASSOCIATED SITE

BOOKMARK JUMP: ▶

PROVISION INFORMATION FILE NAME XXX.doc  REFERENCE

TITLE INTRAMURAL COMMUNICATION No. 4096

PROVIDER B1 — ⊙ OPEN (REG. WITH PERSONAL ID)
NAME B2 — ○ NOT OPEN  REG. IN INTRAMURAL COMMUNI-CATION EDITING SEC. ▶ — B3

RECIPIENT INFORMATION

| SEPARATE REGISTRATION | | PROVISION FORMAT | |
|---|---|---|---|
| 1001 | | ☑ ORIGINAL FORMAT | ☑ PDF FORMAT |
| 1005 | | ☐ ORIGINAL FORMAT | ☑ PDF FORMAT |
| | | ☐ ORIGINAL FORMAT | ☑ PDF FORMAT |
| ... | | | |

| GROUP REGISTRATION | | PROVISION FORMAT | |
|---|---|---|---|
| XY SEMINAR | REFERENCE | ☑ ORIGINAL FORMAT | ☑ PDF FORMAT |
| XZ SUB. | REFERENCE | ☐ ORIGINAL FORMAT | ☑ PDF FORMAT |

FIG. 6 _/ 152

PROVISION INFORMATION DB

| PROVISION INFORMATION FILE NAME | PROVIDER NAME | RECIPIENT INFORMATION | PROVISION FORMAT | URL |
|---|---|---|---|---|
| INTRAMURAL COMMUNICATION | NOT OPEN (INTRAMURAL COMMUNICATION EDITING SEC.) | 1005 | ORIGINAL | xxx.xx.xxx |
| | | | PDF | xOx.Ox.xOx |
| | | 1008 | PDF | OOx.xx.Oxx |
| | | 1185 | PDF | △OO.△x.OxO |
| | | XY SEMINAR | ORIGINAL | OxO.△△.△xO |
| | | | PDF | OxO.△O.△△O |
| | | ... | ... | ... |
| PAPER OF XY ACADEMIC SOCIETY | OPEN (8005) | 1009 | ORIGINAL | xxx.△△.x△x |
| | | | PDF | xOx.△x.xxx |
| | | XX STUDY ROOM | PDF | x△x.x△.x△x |
| | | ... | ... | ... |
| GREETING 1 OF PRESIDENT XX | NOT OPEN (GENERAL AFFAIRS DEPT., GENERAL AFFAIRS SEC.) | XZ DEPT. | IMAGE | INTRAMURAL URL Oxx.O△.OOO Oxx.x△.OOO |
| | | XY DEPT. | IMAGE | INTRAMURAL URL △△△.OO.△OO △△△.△O.OOO |
| | | ... | ... | ... |
| ... | | | | |

FIG. 7

| FILE(F) EDIT(E) DISPLAY(V) JUMP(G) HELP(H) |
|---|

RETURN NEXT REREAD HOME RETRIEVE GUIDE PRINT STOP

BOOKMARK   JUMP: ▶

THERE ARE FOLLOWING INFORMATION.              ASSOCIATED SITE

| TITLE | PROVIDER | UPDATE DATE | DOWNLOAD ORIGINAL DATA | PDF DISPLAY |
|---|---|---|---|---|
| MEMBER LIST FOR STUDY ROOM IN 2001 | XY TEC. COURSE EXECUTIVE OFFICE | MARCH 16, 2001 | DOWNLOAD  B4  B5 | DISPLAY |
| PAPER OF XY ACADEMIC SOCIETY | XXXX | MARCH 18, 2001 | DOWNLOAD | DISPLAY  B6 |
| GREETING 1 OF PRESIDENT ∞ | GENERAL AFFAIRS DEPT., GENERAL AFFAIRS SEC. | MARCH 20, 2001 | DOWNLOAD | |
| XYXX.exe. (XY ANALYZER) PROGRAM | YYYY | MARCH 25, 2001 | DOWNLOAD | |
| ... | ... | ... | ... | ... |

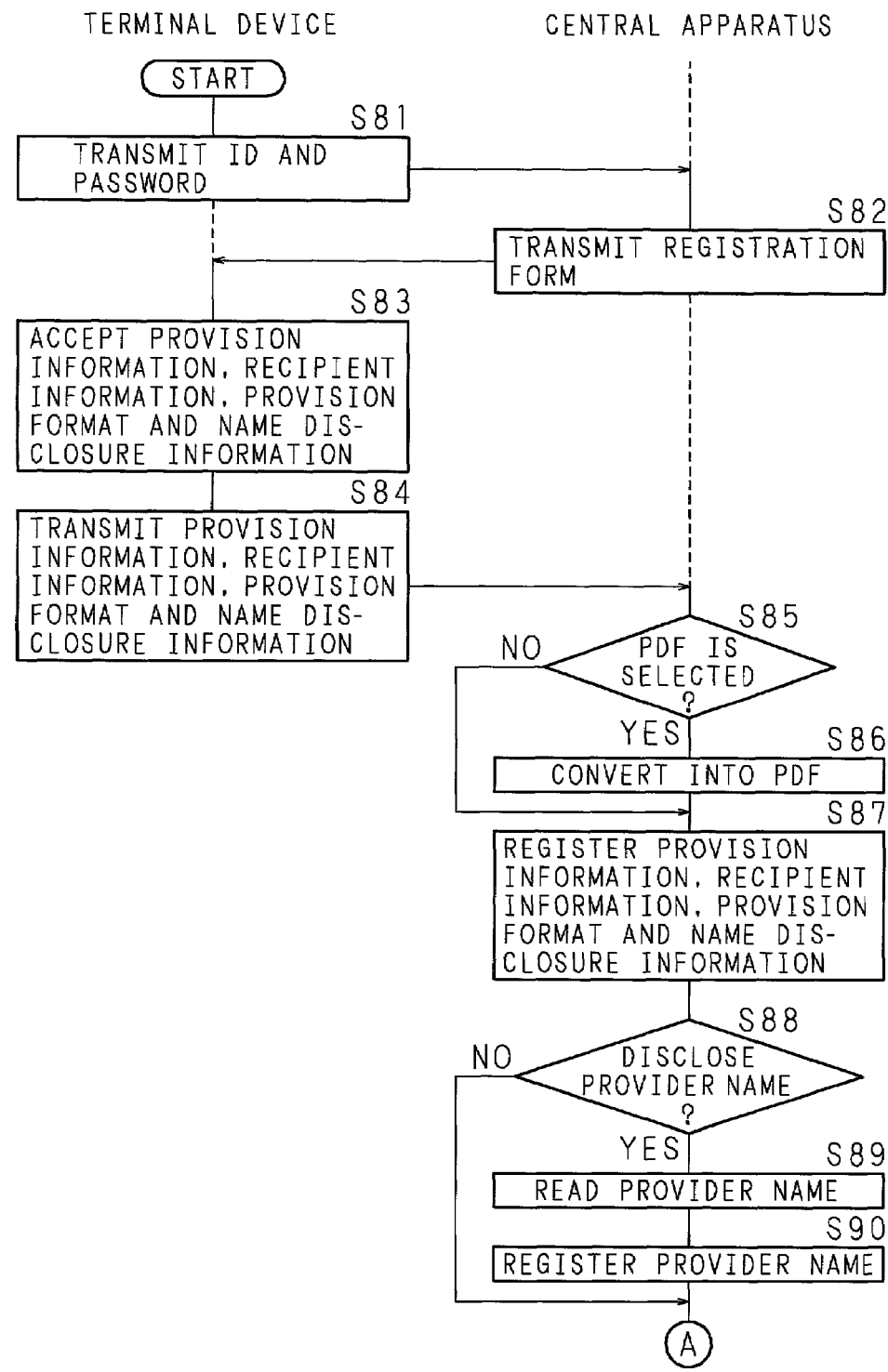

INFORMATION PROVIDING METHOD, INFORMATION PROVIDING SYSTEM, TERMINAL DEVICE, CENTRAL APPARATUS AND COMPUTER MEMORY PRODUCT

BACKGROUND OF THE INVENTION

1. Field of the Invention

The present invention relates to an information providing method for providing provision information registered in a central apparatus by a request for receipt of a plurality of terminal devices connected to the central apparatus through a communication network.

2. Description of Related Art

In an organization such as universities or companies, there has been built a network in which information to be provided are registered in a central apparatus such as a WWW server computer and information required for students or employees are read or downloaded through a browser or the like, thereby sharing provision information. Such network is built in an intranet of the organization, and furthermore, desired information can be acquired through the Internet on the outside of the intranet if necessary.

However, in the case where the information are registered in the central apparatus, a third person can freely acquire the information. Therefore, there has been a problem in that information having a high secrecy cannot be registered easily. Moreover, provision information (information to be provided) such as a research paper, a research thesis or an operation manual has such a high literary property that they can be read but a problem arises if original data themselves are freely copied and easily reused. For this reason, original data of such provision information itself cannot be registered in many cases.

Referring to information having a high literary property such as a research thesis and information for individuals such as notification matters to be given from an academic adviser to students, moreover, it is necessary to disclose a provider name and to make the source of the provision information clear. On the other hand, referring to general matters having a low literary property such as information about employment, the opening time of a cafeteria or information about no class, it is not necessary to specially make a provider name clear. Alternatively, it is not desired that the personal name of the provider is known in some cases.

In the case where provision information having a large data volume such as a motion picture is to be provided, furthermore, a hindrance is not particularly occurred in an intranet under an excellent communication environment having a communication capability in a giga-unit, for example. In the case where the motion picture is to be provided through the Internet having a poor communication environment, a traffic between a central apparatus and a terminal device is greatly influenced.

BRIEF SUMMARY OF THE INVENTION

In consideration of the circumstances, the present invention has been made.

It is a first object of the present invention to provide an information providing method, an information providing system and a central apparatus which can cause an information provider to select a recipient capable to receive a provision information and to select the provision format of provision information for each recipient, thereby determining the recipient (recipient is the object whom the provision information is disclosed) and the disclosing format of the provision information at the will of the information provider depending on the literary property of the provision information, and furthermore, retaining the secrecy of the provision information and preventing deadcopy. Further more, it is the first object of the present invention to provide a computer memory product in which a computer program for causing a computer to function as the central apparatus is recorded.

It is a second object of the present invention to provide an information providing system capable of providing information depending on the type and property of provision information by selecting that the provider name of the provision information is disclosed or not.

It is a third object of the present invention to provide an information providing system capable of providing provision information having a smaller information volume than that of original provision information when an access is given from a communication network having a low communication speed, thereby relieving the load of a communication traffic.

The information providing method for providing provision information which is to be provided and registered in a central apparatus in response to a request from plural terminal devices which are connected to the central apparatus by a communication network, characterized by comprising the steps of accepting, by one terminal device, a provision information, a recipient information relating to a recipient who is authorized to receive the provision information, and a provision format of the provision information to be applied to the recipient; transmitting, by the one terminal device to the central apparatus, the accepted provision information, recipient information, and provision format; registering, in the central apparatus, the transmitted provision information, recipient information, and provision format; receiving, by the central apparatus, a request and recipient information transmitted from one of terminal devices; and providing, by the central apparatus to the one of terminal devices which transmitted the recipient information, a registered provision information corresponding to the registered provision format based on the received recipient information.

In the present invention, professors, students, the staff of the clerks' office and the like transmit provision information such as a research thesis or a teaching schedule from one terminal device to a central apparatus and thereby registers them in the central apparatus. When a request for receiving the provision information is given from one of terminal devices of a student or the like, the provision information is provided. In this case, the terminal device accepts the provision information, and furthermore, recipient information relating to a recipient who can receive the provision information. For example, an ID number of a student who is authorized to receive the information, a group belonging to a particular study room and the like correspond to the recipient information.

Furthermore, the terminal device accepts the providing format of the provision information for each recipient. For example, the provision format is the PDF (Portable Document Format) of provision information or an original format having no change. An information provider such as a professor exactly registers the providing format of the provision information by selecting an original format or the PDF obtained by converting the original provision. For example, a research thesis in an original format may be provided to a student belonging to a study room or the like and other groups and students can read the research thesis but deadcopy should be prevented in some cases. In those cases, the original format and the PDF are registered as a provision format for the group of the study room to be the recipient, while only the PDF is registered as the provision format in other groups and students and the like.

The provision information, recipient information and provision format thus accepted are transmitted to the central apparatus and are registered therein. In the case where the recipient information is transmitted from other terminal devices such as a student, the provision information corresponding to the registered provision format is provided to the other terminal devices based on the received recipient information. More specifically, in the above-mentioned example, when a request is given from the recipient related to the group of the study room, the provision information related to the original format and the PDF as the provision format is provided. On the other hand, when the request is given form the recipient related to other groups and students and the like, only the provision information of the PDF is provided as the provision format.

The present invention is constructed as described above, it is possible to determine the recipient and the disclosing format of the provision information by the will of the information provider depending on the literary property of the provision information. Consequently, the secrecy of the information to be provided is retained, and furthermore, the deadcopy of the provision information can be prevented from being carried out easily.

In the present invention, moreover, one terminal device accepts name disclosure information indicating whether the provider name of the provision information is disclosed or not. The name disclosure information thus accepted is transmitted to the central apparatus and is registered therein. When the provider name is to be disclosed, the provider name is transmitted to the terminal device of a student or the like at providing the provision information. On the other hand, when the provider name is not disclosed, it is not transmitted but the name of a group to which the provider belongs is transmitted. Referring to a research thesis, notification matters to be given from an academic advisor to students and the like, consequently, the provider name can be disclosed to make the source of the information clear. On the other hand, general matters such as information about employment, the opening time of a cafeteria or information about no class can be transmitted with a proper group name without disclosing the provider name which is not related to this kind of provision information.

In the present invention, moreover, auxiliary provision information whose information volume is reduced is further registered in the central apparatus. For example, in the case of a motion picture, the number of pixels is decreased or the number of frames is decreased as compared with an original motion picture. The central apparatus judges whether a request is given from one of terminal devices through a communication network such as an intranet or another communication network such as the Internet which is different therefrom. When it is judged that the request is given from the terminal device through another communication network, the auxiliary provision information whose information volume is reduced is provided to one of terminal devices in place of the original provision information. Thus, optimum provision information is provided corresponding to a place for the request given from the terminal device. Consequently, it is possible to greatly reduce the load of a communication traffic between the central apparatus and the terminal device.

The above and further objects and features of the invention will more fully be apparent from the following detailed description with accompanying drawings.

BRIEF DESCRIPTION OF THE SEVERAL VIEWS OF THE DRAWINGS

FIG. 3 is a diagram illustrating the record layout of a recipient DB according to the present invention;

FIG. 4 is a diagram illustrating the record layout of a group DB according to the present invention;

FIG. 5 is a diagram illustrating an image on a display when provision information is to be registered according to the present invention;

FIG. 6 is a diagram illustrating the record layout of a provision information DB according to the present invention;

FIG. 7 is a diagram illustrating an image on a display when a request for receipt is given from a terminal device to a central apparatus according to the present invention;

FIG. 8 is a flow chart showing a processing procedure for registering provision information according to the present invention;

DESCRIPTION OF THE PREFERRED EMBODIMENTS

First Embodiment

Figure 1:
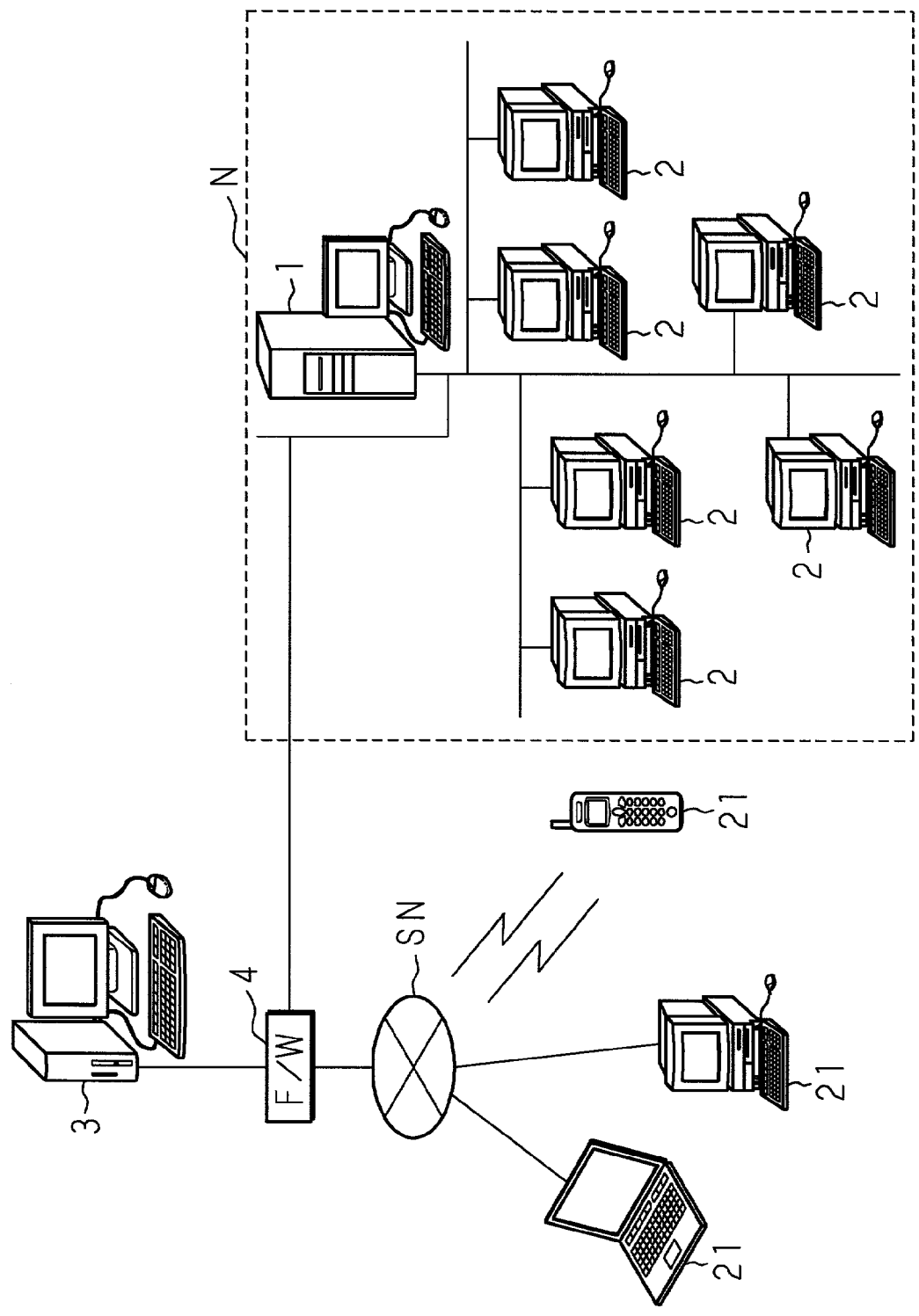
FIG. 1 is a view illustrating the summary of an information providing system according to the present invention.

FIG. 1 is a schematic view illustrating an information providing system of the present invention. In FIG. 1, the reference numeral 1 denotes a central apparatus registering provision information therein. Terminal devices 2, 2, 2 . . . such as personal computers are connected to the central apparatus 1 through a communication network N constructed in a predetermined space such as an intranet. Each of the terminal devices 2, 2, 2 . . . can acquire necessary provision information from the central apparatus 1. Moreover, terminal devices 21, 21, 21 . . . other than the intranet are connected to the central apparatus 1 through an auxiliary communication network SN such as the Internet. Provision information can also be acquired from each of the terminal devices 21, 21, 21 . . . .

In the case where the provision information of the central apparatus 1 is to be acquired from the terminal device 21 through the auxiliary communication network SN, a direct access to the central apparatus 1 cannot be acknowledged due to an F/W computer 4 functioning as a fire wall and only an access to the computer 3 having a WWW (World Wide Web) server function is permitted. The computer 3 gives a request for acquiring the necessary provision information to the central apparatus 1 in response to a request sent from the terminal device 21 and transmits the acquired provision information to the terminal device 21.

Figure 2:
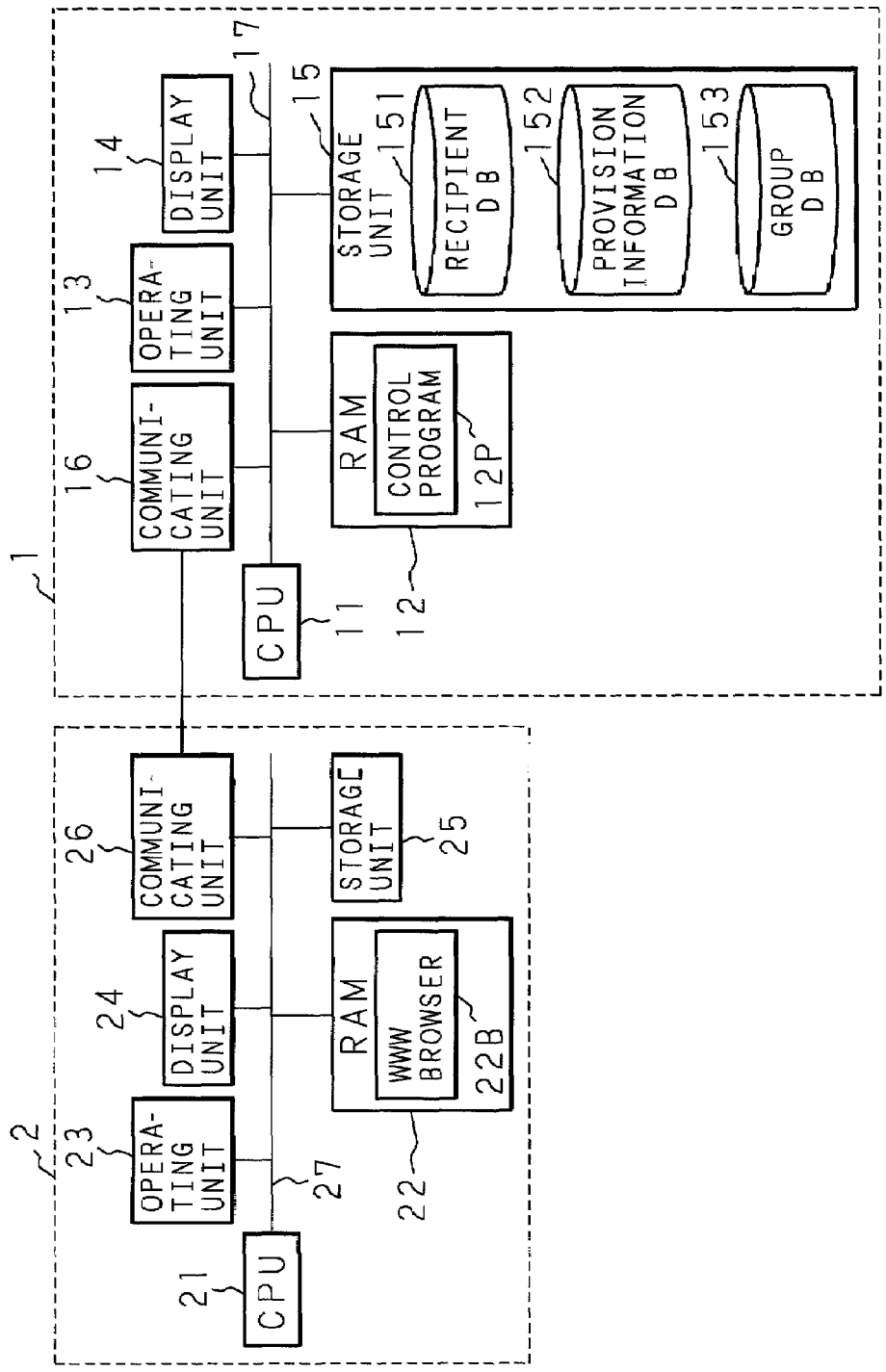
FIG. 2 is a block diagram showing the hardware structures of a central apparatus and a terminal device according to the present invention.

FIG. 2 is a block diagram showing the hardware structures of the central apparatus 1 and the terminal device 2. First of all, the central apparatus 1 will be described. As shown in FIG. 2, an RAM (Random Access Memory) 12, an operating unit 13 such as a keyboard and a mouse, a display unit 14 such as a liquid crystal display, a storage unit 15 such as a hard disc, and a communicating unit 16 such as a LAN connecting board are connected to a CPU (Central Processing Unit) 11 through a bus 17. Moreover, the RAM 12 stores a control program 12P including an application written by the Java language, the C language or the like for executing a method according to the present invention which will be described below.

Moreover, the storage unit 15 stores a recipient data base (which will be hereinafter referred to as a recipient DB) 151 registering information about a recipient and the like, a provision information data base (which will be hereinafter referred to as a provision information DB) 152 registering provision information, the provision format of the provision information and the like, and a group data base (which will be hereinafter referred to as a group DB) 153 registering information about a group to which the recipient belongs. The contents of the DBs will be described below. While description will be given to the case where provision information provided by a professor, a student, the staff of a clerks' office and the like are registered in the central apparatus 1 and the provision information thus registered are received from the terminal devices 2 used by the student, the professor, the staff and the like respectively, the present invention is not restricted thereto but can also be applied to the case where provision information in a company, a hospital and the like are to be registered and received.

Next, the structure of the terminal device 2 will be described. Since the terminal device 21 has the same structure as that of the terminal device 2, detailed description will be omitted. As shown in FIG. 2, an RAM 22, an operating unit 23 such as a keyboard and a mouse, a display unit 24 such as a liquid crystal display, a storage unit 25 such as a hard disc, and a communicating unit 26 such as a LAN connecting board are connected to a CPU 21 through a bus 27. Moreover, the RAM 22 stores a WWW browser 22B for executing the method according to the present invention which will be described below.

FIG. 3 is a diagram illustrating the record layout of the recipient DB 151. As shown in FIG. 3, there are registered information about a password, a name, a department, a subject and a study room to which a student belongs and the like which are to be used for authentication when receiving provision information corresponding to peculiar identification information (hereinafter referred to as an ID) given to each of students, teachers, staff and the like. It is preferable that an administrator should properly input each information from the operating unit 13.

FIG. 4 is a diagram illustrating the record layout of the group DB 153. The group DB 153 registers a department DB 1531 registering the ID of a student belonging to each department, a subject DB 1532 registering the ID of a student belonging to each subject, and a study room DB 1533 registering the ID of a student belonging to each study room. The department DB 1531 is obtained by sorting the recipient DB 151 based on information about each department. Similarly, the subject DB 1532 and the study room DB 1533 are also obtained by sorting the recipient DB 151 for each item. The group DB 153 includes a staff DB (not shown) registering the ID of the staff for each group to which the staff belongs, a teacher DB (not shown) registering the ID of a teacher for each group to which the teacher belongs, and the like.

FIG. 5 is a diagram illustrating an image on the display when registering the provision information. The provision information registered by an information provider such as a professor is uploaded from the terminal device 2 to the central apparatus 1. In the case where the provider carries out log-in based on the peculiar ID and password which are given previously, the central apparatus 1 refers to the recipient DB 151 and authenticates the provider. When the authentication is successful, a document such as an HTML shown in FIG. 5 is displayed on the browser of the terminal device 2. For an input item, information about the file name and title of the provision information and the provider name, information about a recipient, a provision format and the like are inputted. Each input item will be described below in detail.

The file name of the provision information is inputted by directly inputting or selecting a file name to be registered. The provision information may be an image file, a motion picture file, a computer program and the like as well as a document file. The title is a header for providing the provision information to the recipient, and a name by which the contents of the provision information can easily be grasped is inputted. For the provider name, it is possible to alternatively select that the provider name is to be disclosed or not depending on check boxes B1 and B2. In the case where the name of the provider himself/herself is to be disclosed to the recipient, the check box B1 is checked. In this case, the central apparatus 1 refers to the recipient DB 151 to extract a name corresponding to a transmitted ID based on the same ID and discloses the extracted name together with the provision information. Referring to provision information having a high literary property such as the paper of an academic society, a computer program to be used for a study and the like, thus, it is possible to check the check box B1 so as to disclose the provider name.

On the other hand, in the case where the provider name is not disclosed, the check box B2 is clicked. In this case, a group name is selected in place of the provider name. A plurality of group names owned by the provider and having a write authority are automatically embedded in the HTML of a pull-down box B3 and one of the groups can be selected. In the shown example, the name of an intramural communication editing division is disclosed in place of the provider name. Thus, it is possible to conceal the provider name for provision information having a low literary property such as information about no class, an intramural information magazine and the like.

A recipient who is authorized to receive the provision information is inputted to the recipient information. More specifically, as shown in FIG. 5, IDs can be inputted individually, and furthermore, a study room, a subject and the like can be inputted in a group unit. In the case of the input in a group unit, the name of the subject, the name of the study room and the like which are to be disclosed can be inputted as shown. The provision format of the provision information is inputted for each recipient in a provision format column. In the case where the provision information is to be provided without processing, an original format is selected. Moreover, in the case where the provision information is to be disclosed in the PDF, the PDF is selected.

Referring to a research paper, the paper of an academic society and the like which have a high literary property, it is necessary to prevent a dead copy. Therefore, only the PDF is selected. For these papers, moreover, an original format capable of being deadly copy may be distributed to a student, an assistant and the like in the same study room. In this case, the original format is selected in addition to the PDF. The input items and provision information described above are registered in the provision information DB 152 of the central apparatus 1. In the case where the PDF is selected, the terminal device 2 activates a previously installed software "Acrobat (trademark)" produced by Adobe Systems Co., Ltd. or a software having the equivalent functions, thereby converting the provision information into the PDF. The provision information in the PDF thus converted is transmitted to the central apparatus 1. While the conversion into the PDF is to be executed in each terminal device 2 according to the embodiment, batch conversion may be carried out in the central apparatus 1.

FIG. 6 is a diagram illustrating the record layout of the provision information DB 152. As shown in FIG. 6, the presence of the disclosure of a provider name, recipient information, provision format, and a URL to be a storage destination of provision information are registered corresponding to the provision information file name transmitted from the terminal device 2. In addition, there are registered various information, for example, the title of the provision information, the registration date of the provision information, data in the original format of the provision information, data in the PDF and the like, which are not shown.

Referring to the provision information such as a motion picture, furthermore, auxiliary provision information having an information volume reduced is registered. For example, referring to provision information about a greeting 1 of President XX, a 50 kB REAL Media file is registered in addition to a 5.25 MB MPEG (Moving Picture Experts Group) file. For the auxiliary provision information, the number of pixels is heightened, the number of frames is decreased and a compression rate is reduced for the original provision information in order to transmit the minimum information also in an environment in which a communication speed is low.

In the present invention, in the case where an access is given through the communication network N such as an intranet, the central apparatus 1 reads, from the provision information DB 152, provision information (the URL of an intramural VOD (Video On Demand)) having an information volume which is not reduced, and streaming delivers the same provision information. In the case where the access is given through the auxiliary communication network SN such as the Internet, the central apparatus 1 reads, from the provision information DB 152, auxiliary provision information (the URL of an extramural VOD) having an information volume reduced, and streaming delivers the same auxiliary provision information. In the following, the URL of the intramural VOD will be referred to as an intramural URL and the URL of the extramural VOD will be referred to as an extramural URL.

FIG. 7 is a diagram illustrating an image on the display when giving a request for receipt from the terminal device 2 to the central apparatus 1. An access is given from the terminal device 2 to the central apparatus 1. After authentication is successful based on an ID and a password, the central apparatus 1 reads information about the title of the provision information, a provision format and the like from the provision information DB 152 based on the ID which is the recipient information, and creates an HTML. The HTML thus created is transmitted to the terminal device 2 and is displayed by the browser of the terminal device 2 as shown. For each title of the provision information, as shown, a provider, an update date, a download specifying button B4 for original format, and display buttons B5 and B6 for displaying the PDF are displayed. The download specifying button B4 and the like have a hyperlink. By clicking these buttons, information of a link destination is transmitted to the central apparatus 1. The central apparatus 1 reads the provision information from the provision information DB 152 and transmits it to the terminal device 2.

Referring to a member list for a study room in 2001, for example, a provider name is not disclosed and provision information can be downloaded by an original format or can be displayed by the PDF. When the download button B4 is clicked, the central apparatus 1 reads, from the provision information DB 152, a file in the original format of the member list for the study room in 2001 and transmits it to the terminal device 2. Consequently, a recipient can acquire the provision information. Referring to the paper of a XY academic society, the provider name is disclosed. When the display button B6 for the PDF is clicked, the central apparatus 1 reads, from the provision information DB 152, a file in the PDF of the paper of the XY academic society and transmits it to the terminal device 2. Consequently, the recipient can acquire the provision information.

Figure 9:
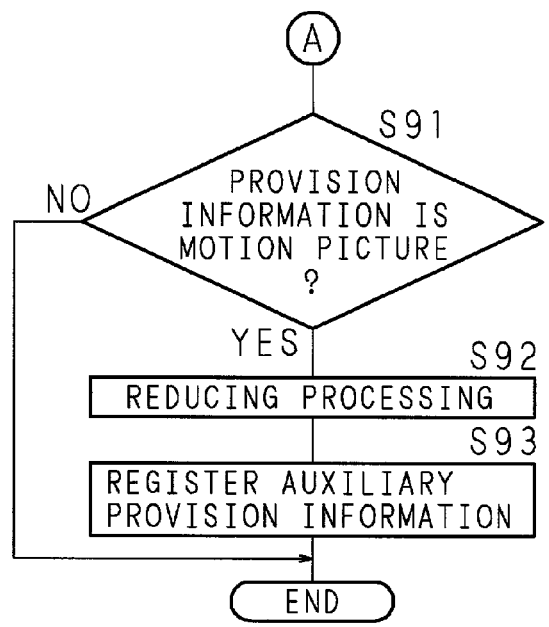
FIG. 9 is a flow chart showing the processing procedure for registering provision information according to the present invention.

With the above-mentioned structure, the processing procedure according to the present invention will be described with reference to flow charts. FIG. 8 and FIG. 9 are flow charts showing a processing procedure for registering provision information. First of all, a provider such as a professor to desire the registration of provision information inputs an ID and a password to the terminal device 2 and transmits them to the central apparatus 1 (Step S81). The central apparatus 1 carries out authentication with reference to the recipient DB 151. In the case where it is decided that the ID and the password are correct, a registration form HTML (see FIG. 5) prestored in the storage unit 15 is read and transmitted to the terminal device 2 (Step S82).

Subsequently, the provider inputs provision information and recipient information to the registration form shown in FIG. 5. Moreover, the provider inputs a provision format such as an original format or the PDF for providing the provision information to each recipient. Furthermore, the provider inputs name disclosure information to specify that the provider name is disclosed or not. The provision information, the recipient information, the provision format and the name disclosure information which are inputted from the operating unit 23 are accepted (Step S83). Then, the provision information, the recipient information, the provision format and the name disclosure information thus accepted are transmitted to the central apparatus 1, respectively (Step S84). The original format is transmitted as the provision information.

The central apparatus 1 decides whether or not the PDF is selected as the provision format (Step S85). When the PDF is selected (YES in Step S85), a PDF conversion program prestored in the storage unit 25 is executed and the provision information is converted into the PDF (Step S86). On the other hand, when the PDF is not selected (NO in Step S85), the process of the Step S86 is skipped.

The central apparatus 1 registers, in the provision information DB 152 of the storage unit 15, the provision information, the recipient information, the provision format and the name disclosure information which are received (Step S87). As shown in FIG. 6, the URL to be a storage destination of the provision information corresponding to each provision format (the original format or the PDF) is also registered at the same time. Furthermore, the CPU 11 decides whether or not an instruction for disclosing the provider name is given as the name disclosure information for the transmitted provision information (Step S88). When the instruction for disclosing the provider name is given (YES in Step S88), the recipient DB 151 is retrieved and the provider name is read based on the ID transmitted at the Step S81 (Step S89). The provider name thus read is registered in the provision information DB 152 corresponding to the provision information (Step S90). On the other hand, when the instruction for disclosing the provider name is not given (NO in Step S88), the processes in the Steps S89 and S90 are skipped. In the case where the instruction for disclosing the provider name is not given, a transmitted group name is registered in place of the provider name.

Subsequently, the CPU 11 judges whether or not the transmitted provision information is a motion picture (Step S91).

When the CPU 11 judges that the provision information is the motion picture (YES in Step S91), a reducing process of data volume of the motion picture is carried out (Step S92). More specifically, the reducing process is carried out by a change of a compression rate, a change of the number of frames, a change of a compression format and the like. The auxiliary provision information subjected to the reducing process is registered in the provision information DB 152 together with the extramural URL to be a storage destination (Step S93). Referring to the provision information (motion picture) which is not subjected to the reducing process, similarly, the intramural URL to be a storage destination is registered in the provision information DB 152. When the provision information is not the motion picture (NO in Step S91), the processes in the Steps S92 and S93 are skipped.

Figure 10:
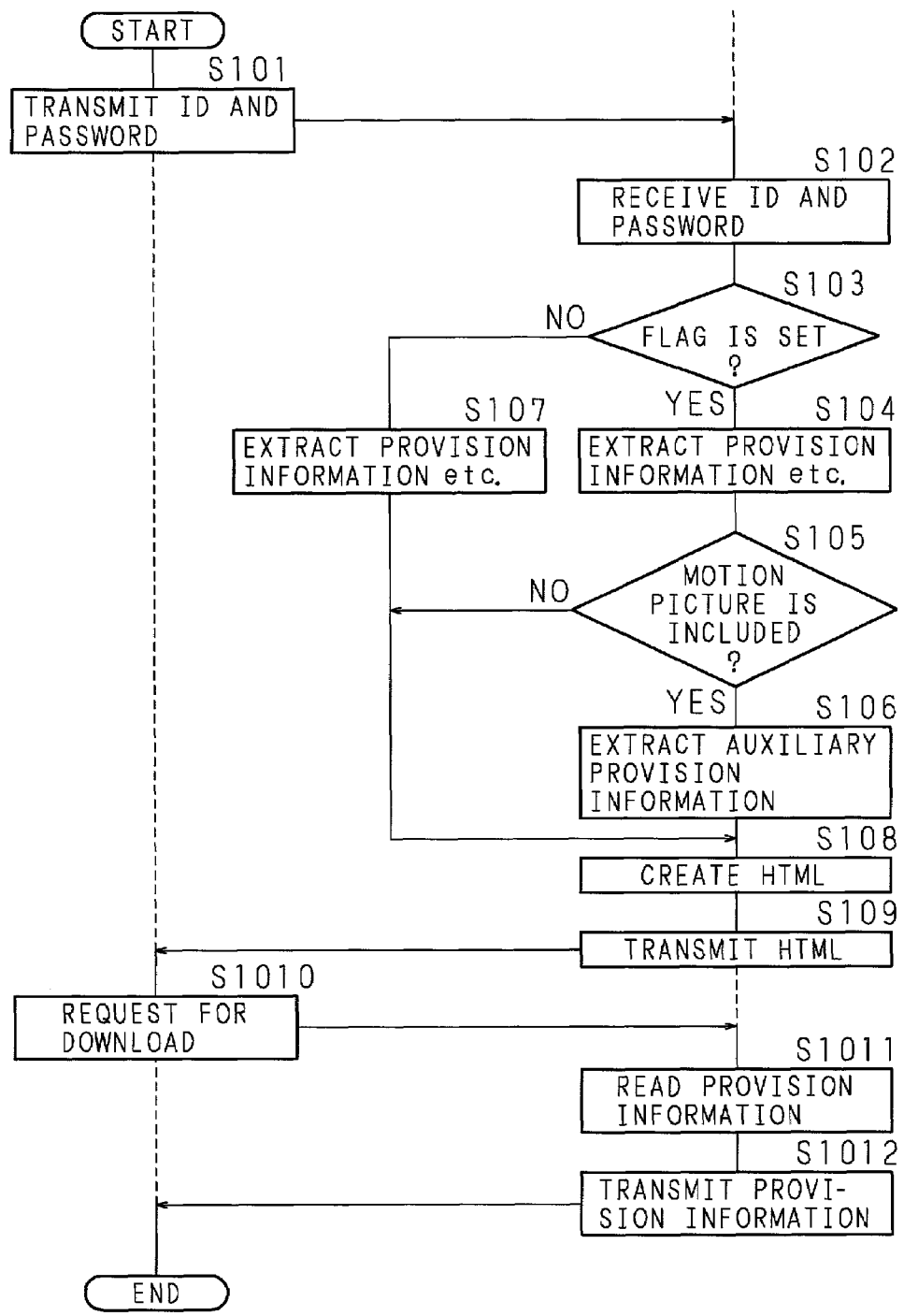
FIG. 10 is a flow chart showing a processing procedure in the case where a request for receipt is given to the central apparatus according to the present invention.

FIG. 10 is a flow chart showing a processing procedure to be carried out when a request for receipt is given to the central apparatus 1. The request for receipt given to the central apparatus 1 can be sent from the terminal device 2 through the intramural communication network N or the terminal device 21 through the extramural auxiliary communication network SN. In the case where an access is given from the terminal device 2 through the communication network N, an ID and a password are transmitted to the central apparatus 1 (Step S101). Oh the other hand, in the case where an access is given from the terminal device 21 through the auxiliary communication network SN, the ID and the password are first transmitted to the computer 3 and the computer 3 sets a flag and transmits, to the central apparatus 1, the ID and the password together with set information of the flag (Step S101).

The central apparatus 1 receives the ID and the password (Step S102) and carries out authentication. After the authentication is successful, it is decided whether or not the flag is set (Step S103). In other words, it is decided whether an intramural or extramural access is given. If the flag is not set (NO in Step S103), that is, the intramural access is given, the provision information DB 152 is retrieved based on the transmitted ID, thereby extracting provision information, a title, a provider name or a group name, a provision format, a URL to be the link destination of the provision information and the like (Step S107). When the motion picture is included in the provision information, the intramural URL is extracted. The central apparatus 1 creates an HTML based on information about the title, the provider name or the group name, the provision format, the URL (intramural URL) and the like of the provision information thus extracted (Step S108) and stores the created HTML in the RAM 12. At creating the HTML, a template is prepared so that the HTML is created by embedding extracted information in the template. Moreover, the download button B4 shown in FIG. 7 or the like is created in a hyperlink format, and an image indicative of downloading and a URL to be the registration destination of the provision information DB 152 registering the provision information in the original format or the PDF are written into a tag indicated as <A HREF> to </A>. The central apparatus 1 reads the HTML thus created from the RAM 12 and transmits it to the terminal device 2 (Step S109). Consequently, an image of the HTML in FIG. 7 is displayed on the browser in the terminal device 2.

On the other hand, when it is judged that the flag is set at the Step S103 (YES in Step S103), that is, it is judged that an extramural access is given, the provision information DB 152 is retrieved based on the transmitted ID to extract provision information, a title, a provider name or a group name, a provision format, a URL and the like in the same manner as in the Step S107 (Step S104). Subsequently, the CPU 11 judges whether or not a motion picture is included in the provision information thus extracted (Step S105). When the motion picture is not included (NO in Step S105), the process proceeds to the Step S108 where an HTML file is created based on the title of the provision information extracted in the same manner as in the above-mentioned process (Step S108).

On the other hand, when the motion picture is included in the provision information (YES in Step S105), auxiliary provision information, a title, a provider name or a group name, an extramural URL to be a storage destination of the auxiliary provision information and the like are extracted (Step S106), and an HTML is created based on the extramural URL to be a link destination of the auxiliary provision information in place of the intramural URL to be a link destination of the provision information. In other words, when an extramural access is given, a communication environment is poorer than that in school. Referring to the provision information having a large information volume such as a motion picture, therefore, the auxiliary provision information having an information volume reduced is provided. While the information volume is reduced only for the motion picture in the present embodiment, the present invention is not restricted thereto but may be applied to a music file or the like.

Then, the download button B4 or the like is clicked through the terminal device 2 or the terminal device 21, thereby giving a request for downloading (Step S1010). If the central apparatus 1 receives the request for downloading, the provision information or the auxiliary provision information is read from the provision information DB 152 (Step S1011), and the provision information thus read or the like is transmitted to the terminal device 2 or the terminal device 21 (Step S1012). More specifically, when the download button B4 or the like is clicked, the process jumps to the URL embedded in the hyperlink and the provision information of an original format or the PDF is read from a jump destination and the provision information thus read or the like is transmitted to the terminal device 2.

Second Embodiment

Figure 11:
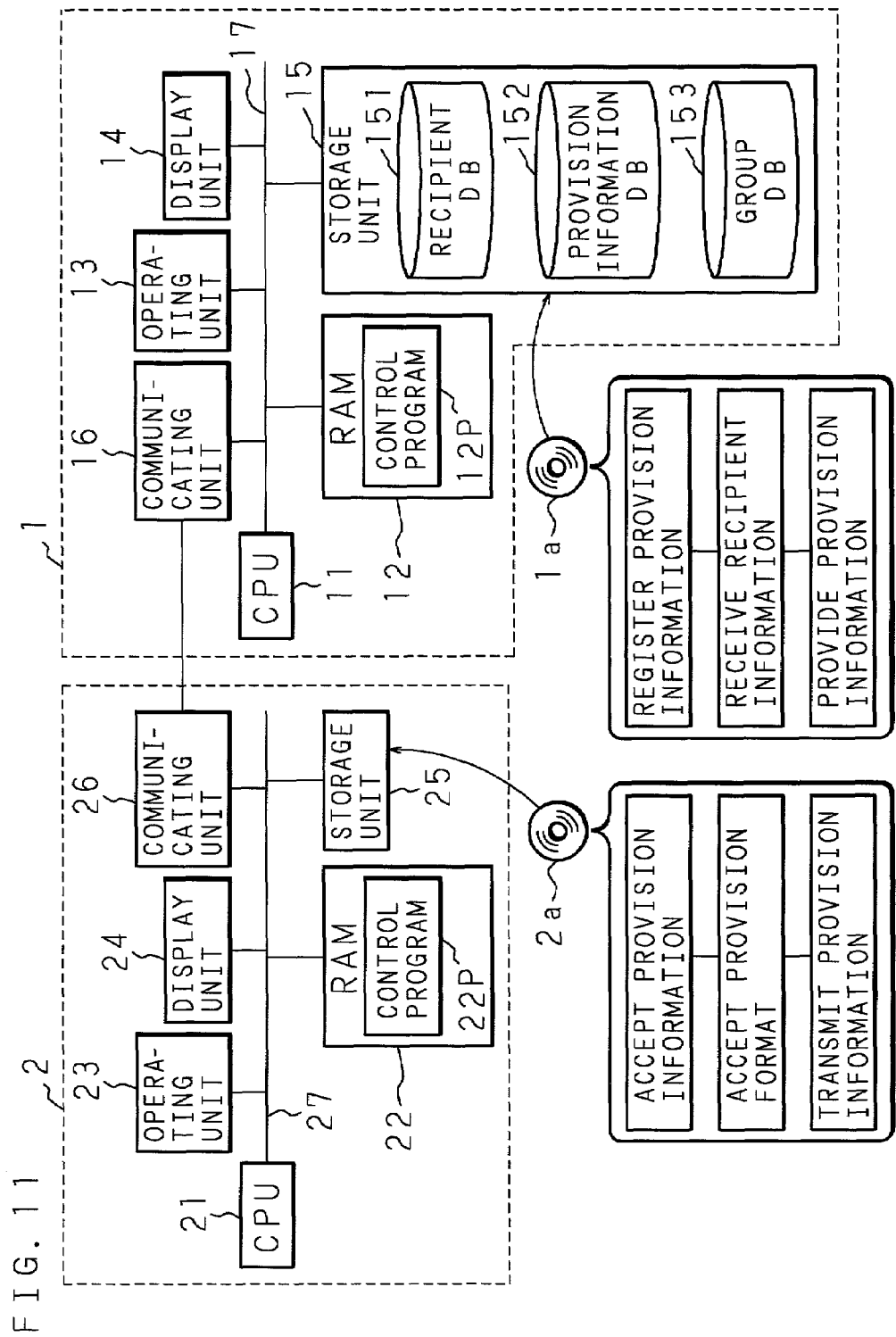
FIG. 11 is a block diagram showing the structures of a central apparatus and a terminal device of a second embodiment according to the present invention.

FIG. 11 is a block diagram showing the structures of a central apparatus 1 and a terminal device 2 according to a second embodiment. Moreover, a computer program for executing the central apparatus 1 according to the first embodiment can be preinstalled on a computer-readable medium in the central apparatus 1 , or can be provided on a portable computer-readable medium, CD-ROM or an MO in the second embodiment. Moreover, in a third embodiment a computer program can be propagated as a carrier through a line so as to be provided. The contents will be described below.

A computer memory product 1a (CD-ROM, MO, DVD-ROM or the like) recording a program for causing the central apparatus 1 shown in FIG. 11 to register provision information and the like, to receive recipient information and to provide the provision information is installed in a storage unit 15 of the central apparatus 1. Such a program is loaded into a RAM 12 of the central apparatus 1 and is executed. Consequently, the function of the central apparatus 1 according to the present invention described above can be fulfilled.

Moreover, a computer program for executing the terminal device 2 according to the first embodiment can be preinstalled in the terminal device 2 so as to be provided as in the second embodiment, and furthermore, can be provided through the portable computer memory product such as a CD-ROM or an MO. Furthermore, the computer program can be propagated as a carrier through a line so as to be provided. The contents will be described below.

A computer memory product 2a (CD-ROM, MO, DVD-ROM or the like) recording a program for causing the terminal device 2 shown in FIG. 11 to accept provision information and the like, to accept a provision format and to transmit the provision information and the like is installed in a storage unit 25 of the terminal device 2. Such a program 22P is loaded into a RAM 22 of the terminal device 2 and is thus executed. Consequently, the function of the terminal device 2 according to the present invention described above can be fulfilled.

Since the second embodiment has the above-mentioned structure and other structure and functions are the same as those in the first embodiment, corresponding portions have the same reference numerals and detailed description thereof will be omitted.

As this invention may be embodied in several forms without departing from the spirit of essential characteristics thereof, present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claim is:

1. An information providing method for providing provision information which is to be provided and registered in a central apparatus in response to a request from plural terminal devices which are connected to said central apparatus by a communication network, comprising:
   accepting, by one terminal device directly connected to said central apparatus, as one set of data provision information, recipient information relating to a recipient who is authorized to receive said provision information, and a provision format of said provision information to be applied to said recipient, the provision format including a portable document format that is non-modifiable and is converted from said provision information at the terminal device and an original format which is modifiable and is not converted from said provision information;
   transmitting, by said one terminal device to said central apparatus, the one set of data after said accepting;
   registering, in said central apparatus, the one set of data after said transmitting;
   receiving, by said central apparatus, a request and recipient information of a recipient who generated the request transmitted from one of the terminal devices; and
   providing, by said central apparatus to said one of the terminal devices which transmitted the request and the recipient information, the provision information in the portable document format or the original format corresponding to the provision format based on the recipient information registered in the one set of data, said central apparatus performing an operation of judging whether a request from the one of said terminal devices is transmitted through said network or through another network different from said network;
   registering, as part of the one set of data, auxiliary provision information whose information volume is reduced from said transmitted provision information, and wherein said providing includes providing said auxiliary provision information, according to the provision format registered in the one set of data, to the one of said terminal devices based on the recipient information registered in the one set of data when said judging indicates that the one of said terminal devices transmits the request through the other network.

2. An information providing system for providing provision information to be provided, comprising:
   a central apparatus in which provision information is registered; and
   plural terminal devices which are directly connected to said central apparatus by a communication network, and issue a request for receiving provision information, wherein one terminal device includes a processor performing the following operations of:
   accepting by said one terminal device directly connected to said central apparatus, as one set of data, provision information, recipient information relating to a recipient who is authorized to receive said provision information, and a provision format of said provision information to be applied to said recipient, the provision format including a portable document format that is non-modifiable and is converted from said provision information at the terminal device and an original format which is modifiable and is not converted from said provision information; and
   transmitting, after said accepting, the one set of data to said central apparatus; and
   said central apparatus includes a processor performing the following operations of:
   registering the one set of data transmitted from said one terminal device;
   receiving a request and recipient information of a recipient who generated the request transmitted from one of said terminal devices; and
   providing, to the one of said terminal devices which transmitted the request and the recipient information, the provision information in the portable document format or the original format corresponding to the provision format based on the recipient information registered in the one set of data,
   wherein said operation of registering further registering, as part of the one set of data, auxiliary provision information whose information volume is reduced from said transmitted provision information;
   said processor of said central apparatus is further performing an operation of judging whether a request from the one of said terminal devices is transmitted through said network or through another network different from said network; and
   said operation of providing farther providing auxiliary provision information, according to the provision format registered in the one set of data, to the one of said terminal devices based on the recipient information registered in the one set of data when it is judged that the one of said terminal devices transmits the request through the other network.

3. The information providing system as set forth in claim 2, wherein
   said processor of said one terminal device is further performing an operation of accepting, as part of the one set of data, name disclosure information indicating whether or not a name of provider who provides the provision information to be disclosed;
   said operation of transmitting further transmitting the name disclosure information as part of the one set of data;
   said operation of registering further registering the name disclosure information as part of the one set of data; and
   said operation of providing further providing to the one of said terminal devices which transmitted the request and the recipient information, a name of provider based on the recipient information and the name disclosure information registered in the one set of data.

4. A computer-readable medium encoded with a computer program that when executed causes a computer to provide registered provision information to be provided in response to a request from a computer, according to a method comprising:

causing a first computer to register, as one set of data, provision information, recipient information relating to a recipient who is authorized to receive said provision information, and a provision format of said provision information to be applied to said recipient transmitted from exterior, the provision format including a portable document format that is non-modifiable and is converted from said provision information at the terminal device and an original format which is modifiable and is not converted from said provision information;

causing the first computer to receive transmitted recipient information from a second computer;

causing the first computer to provide to the second computer the provision information in the portable document format or the original format corresponding to the provision format based on the recipient information registered in the one set of data, said central apparatus performing an operation of judging whether a request from the second computer is transmitted through said network or through another network different from said network;

registering, as part of the one set of data, auxiliary provision information whose information volume is reduced from said transmitted provision information; and wherein said auxiliary provision information is provided, according to the provision format registered in the one set of data, to the second computer based on the recipient information registered in the one set of data when said judging indicates that the second computer transmits the request through the other network.

5. An information providing system for providing provision information to be provided, comprising:

a central apparatus in which provision information is registered; and plural terminal devices which are connected to said central apparatus by a communication network and issues a reguest for receiving provision information, wherein one terminal device directly connected to said central apparatus includes:

means for accepting, as one set of data, provision information, recipient information relating to a recipient who is authorized to receive said provision information, and a provision format of said provision information to be applied to said recipient, the provision format including a portable document format that is non-modifiable and is converted from said provision information at the terminal device and an original format which is modifiable and is not converted from said provision information; and means for transmitting the one set of data to said central apparatus; and said central apparatus includes;

means for registering the one set of data transmitted from said one terminal device;

means for receiving a reguest and recipient information of a recipient who generated the request transmitted from one of said terminal devices; and means for providing, to the one of said terminal devices which transmitted the request and the recipient information, registered provision information in the portable document format or the original format corresponding to the provision format based on the recipient information registered in the one set of data, wherein said means for registering further registering, as part of the one set of data, auxiliary provision information whose information volume is reduced from the provision information transmitted by said transmitting means;

said central apparatus further including means for judging whether a request from the one of said terminal devices is transmitted through said network or through another network different from said network; and said means for providing further providing the auxiliary provision information, according to the provision format registered in the one set of data, to the one of said terminal devices based on the recipient information registered in the one set of data when it is judged that the one of said terminal devices transmits the request through the other network.

6. The information providing system as set forth in claim 5, wherein said one terminal device further including means for accepting, as part of the one set of data, name disclosure information indicating whether or not a name of provider who provides the provision information to be disclosed;

said means for transmitting further transmitting said accepted name disclosure information as part of the one set of data;

said means for registering further registering a name disclosure information as part of the one set of data; and said means for providing further providing, to the one of said terminal devices which transmitted the request and the recipient information, a name of provider based on the recipient information and the name disclosure information registered in the one set of data.

7. A method for providing requested information to authorized recipients, comprising:

receiving at a terminal device, from any user who is authorized to store format information for provision information, the format information for each authorized recipient of the provision information, the format information indicating at least one provision format selected from among at least an original format and a portable document format;

storing, as one set of data in computer-readable storage accessible by said at least one server, the provision information stored in the original format that is modifiable and the portable document format that is non-modifiable and is converted from the provision information at said terminal device and accessible by the authorized recipients, recipient information indicating what in the provision information each of the authorized recipients is authorized to receive, and the format information corresponding to the provision information and the recipient information;

receiving, by the at least one server from a requesting terminal device, a request for at least one item of the provision information and a recipient identifier; and transmitting, from the at least one server towards the requesting terminal device, requested provision information in the portable document format or the original format corresponding to a registered provision format if the recipient information indicates that permission to access the requested provision information in the registered provision format has been granted to the recipient identifier;

registering, as part of the one set of data, auxiliary provision information whose information volume is reduced from said transmitted requested provision information, and wherein the at least one server performs an operation of judging whether a request from the requesting terminal device is transmitted through a network or another network different from said network, and wherein said transmitting includes providing said auxiliary provision information, according to the provision format registered in the one set of data, to the requesting terminal device based on the recipient information registered in the one set of data when said judging indicates that the one of said terminal devices transmits the request through the other network.

8. A method as recited in claim 7, further comprising:

receiving, by the at least one server from a providing terminal device, a provider name for a provider of new provision information; and accepting, by the at least one server for storage in the computer-readable storage if the provider name is authorized according to the recipient information, the new provision information, authorized recipient information identifying at least one recipient who is authorized to receive the new provision information, and at least one indication of an authorized format in which the new provision information is to be provided to the at least one recipient, the authorized format including at least the original format of the new provision information and the portable document format converted from the new provision information.

* * * * *

UNITED STATES PATENT AND TRADEMARK OFFICE
CERTIFICATE OF CORRECTION

| | | |
|---|---|---|
| PATENT NO. | : 7,519,716 B2 | Page 1 of 1 |
| APPLICATION NO. | : 10/026557 | |
| DATED | : April 14, 2009 | |
| INVENTOR(S) | : Yoshiko Akazawa et al. | |

It is certified that error appears in the above-identified patent and that said Letters Patent is hereby corrected as shown below:

Column 12, Line 47, claim 2 change "farther" to --further--.

Column 13, Line 44, claim 5 change "reguest" to --request--.

Column 13, Line 58, claim 5 change "includes;" to --includes:--.

Column 13, Line 61, claim 5 change "reguest" to --request--.

Column 14, Line 9, claim 5 change "theone" to --the one--.

Signed and Sealed this

Seventh Day of July, 2009

JOHN DOLL
*Acting Director of the United States Patent and Trademark Office*